United States Patent [19]
Kallin et al.

[11] Patent Number: 5,875,399
[45] Date of Patent: Feb. 23, 1999

[54] METHOD AND ARRANGEMENT IN AN ANALOGUE MOBILE TELESYSTEM

[75] Inventors: Harald Kallin; Anneli Hamill-Keays, both of Sollentuna, Sweden; Francine Laurendeau, Quebec, Canada; John Hayes, Woking, England

[73] Assignee: Telefonaktiebolaget LM Ericsson, Stockholm, Sweden

[21] Appl. No.: 750,873

[22] PCT Filed: Jun. 27, 1995

[86] PCT No.: PCT/SE95/00787

§ 371 Date: Dec. 20, 1996

§ 102(e) Date: Dec. 20, 1996

[87] PCT Pub. No.: WO96/00486

PCT Pub. Date: Jan. 4, 1996

[30] Foreign Application Priority Data

Jun. 27, 1994 [SE] Sweden ................................... 9402289

[51] Int. Cl.⁶ ....................................................... H04B 7/26
[52] U.S. Cl. .............................. 455/434; 455/515; 455/62
[58] Field of Search ..................................... 455/422, 432, 455/433, 434, 435, 450, 451, 452, 455, 507, 509, 511, 515, 62, 63, 65, 67.1, 161.1, 161.2, 161.3, 226.1

[56] References Cited

U.S. PATENT DOCUMENTS

| | | | |
|---|---|---|---|
| 4,868,885 | 9/1989 | Perry ..................................... | 455/226.1 |
| 4,905,301 | 2/1990 | Krolopp et al. ......................... | 455/434 |
| 5,212,803 | 5/1993 | Uddenfeldt et al. .................... | 455/434 |
| 5,239,678 | 8/1993 | Grube et al. ............................ | 455/511 |
| 5,408,684 | 4/1995 | Yunoki et al. .......................... | 455/434 |
| 5,517,673 | 5/1996 | Fehnel ..................................... | 455/434 |

FOREIGN PATENT DOCUMENTS

| | | |
|---|---|---|
| 475248 | 3/1992 | European Pat. Off. . |
| 3-125523 | 5/1991 | Japan . |
| 4-111544 | 4/1992 | Japan . |

*Primary Examiner*—Thanh Cong Le
*Attorney, Agent, or Firm*—Burns, Doane, Swecker & Mathis, L.L.P.

[57] ABSTRACT

An analogue mobile telesystem has traffic channel cells (C1), each of which includes a base station (A–G). These base stations handle combined control channels (PAC) for paging a mobile station (MS), and also access channels (AC) for establishing connections to or from the mobile station (MS). The mobile station has information concerning the frequencies of all of the access channels and the connections are established on duplex traffic channels (TC). The geographical area covered by respective traffic channel cells (C1) is determined by virtue of enabling all traffic channels (TC) within this area to be used for predetermined, common purposes. Each of the traffic channel cells (C1) has at least two access channels (PAC, AC) spaced apart at a desired frequency distance and having the same radio coverage as the traffic channels (TC). When desiring access, the mobile station (MS) scans the strength or power of all access channels on two separate occasions at a mutual spacing of 20 milliseconds. The duplex access channels (PAC, AC) assist the mobile station (MS) in finding the strongest access channel (PAC, AC) despite heavy fading. The mobile station (MS) thereby establishes a connection on the traffic channel (TC) in the most suitable cell (C1) having the highest signal strength. Unnecessary handoffs are avoided and speech quality is improved.

12 Claims, 11 Drawing Sheets

METHOD AND ARRANGEMENT IN AN ANALOGUE MOBILE TELESYSTEM

TECHNICAL FIELD

The present invention relates to a cellular analogue mobile telesystem whose base stations have control and access channels by means of which a mobile user can be coupled in the system and itself request the setting up of a connection.

DESCRIPTION OF THE BACKGROUND ART

In many of the more popular mobile telephony systems, such as AMPS and TACS systems, a mobile station itself determines the cell onto which it locks, by scanning a defined number of frequencies, which are control channels for access purposes, and then choosing that frequency which has the highest received signal strength in the mobile station. The available frequencies in these mobile telesystems are often permanently distributed between the cells and the distribution is often made so that the frequencies can be reused. A normal procedure in this regard is to distribute the frequencies over an area which includes 21 cells, with this 21-cell pattern being later repeated. This distribution pattern enables cells of mutually the same frequencies to be spaced so far apart as to exclude essentially the interference of one cell by another cell.

The AMPS and TACS systems use a control channel for establishing connections and traffic channels for the conversation phase of a connection. The systems normally use 21 frequencies as control channels, based on the popular 21-cell repetition pattern, with one control channel per cell.

The functions of a control channel can be divided into two logical function areas: paging and access. In addition to paging messages to mobile stations with which calls shall be established, the paging channel also includes a general information function, a so-called broadcast information function. Broadcast information may also have an effect on access. In many cases, the paging and access functions lie on one and the same frequency, even in analogue systems such as the aforementioned AMPS and TACS systems. A control channel which has these functions is hereinafter referred to as a combined PAC control channel, ie a paging and access control channel.

In some instances, 21 control channel frequencies can be thought to be too few, for instance in troublesome interference cases where 21 frequencies are insufficient to avoid control channel interferences between the cells. In these instances, it is possible to increase the number of combined PAC control channels up to a total of 32, so as to enable other frequency repetition patterns to be used. Alternatively, it is possible to continue to use the 21-cell pattern while having a number of frequencies in reserve for the event of needing to solve a frequency planning problem in certain troublesome areas.

Naturally, both the paging and the access channel has a limited capacity. The requisite capacity of such channels will depend to a large extent on subscriber behaviour, cell size, etc., but can also be determined by the operator to a large degree, for instance by limiting the paging area over which a paging message is transmitted, or by how often the mobile stations are forced to register themselves.

A high control channel capacity requirement is normally reflected in a high traffic channel requirement, this traffic channel requirement being resolved by adding more cells. When each cell is equipped with a combined PAC control channel, there is immediately obtained a higher access channel capacity. The paging capacity of the PAC control channel increases somewhat, because the connection set-up frequencies in the area will now be divided over more PAC control channels.

Furthermore, the specifications for the aforesaid mobile telesystems AMPS and TACS enable the introduction of microcells that have larger superimposed umbrella cells without effecting the frequency repetition of the umbrella cells. In this case, the umbrella cells are equipped with the combined PAC control channels, while the microcells are equipped with access channels but not with paging channels, as is described in the U.S. Pat. No. 5,357,559. The mobile stations will then lie locked to the paging channel, the combined PAC control channel, in the umbrella cell during a no-call state, while the mobile stations will scan the access channels when making a system access. In this respect, a mobile station will be able to choose the umbrella cell or a microcell, should this latter cell have a stronger signal than the umbrella cell. The advantage with this method is that it is unnecessary to distribute paging signalling to a large number of microcells, and that quickly moving mobile stations are able to move relatively long distances without losing contact with "their" paging channel, such loss of contact necessitating renewed scanning of the paging channels. Thus, a car-carried mobile station, for instance, risks the necessity of constantly carrying out a scanning procedure and locking-in on the paging channels should the microcells be equipped with paging channels. The mobile station is unable to listen for paging messages or other messages during this scanning and synchronizing procedure. The access channels and the combined PAC control channels may be subjected to fading, which may result in the mobile station making access in a less suitable cell. The unnecessarily low signal strength obtained herewith increases the risk that a signalling error will occur when setting up a connection.

A further application of separate paging and access channels is illustrated in U.S. Pat No. 4,799,253 by Stern and Williams. The patent describes a situation in which it is desired to permit two mobile telephone systems to coexist in an area where traffic shall be handled by both systems. One system is permitted to handle paging and access channels, i.e. control channels which all of the mobile stations will be locked onto. In the case of call access in response to a call set-up request from the mobile, it is possible to permit part of the call to be handled by the other system, by sending to these mobile stations a so-called Directed Retry message from the first system. In the AMPS and TACS specifications, Directed Retry means that access of the mobile station is rejected with an invitation to renew the access attempt on any one of up to six given access channel frequencies. The method can provide some improvement in the likelihood that the mobile station will choose the most suitable cell, but the technique is not at all suitable when setting-up calls to the mobile, or for user registration purposes.

The use of a Directed Retry signal procedure will result in two separated cases, depending on how the procedure is used:

In one case, only one frequency is given in the Directed Retry order, this frequency being the frequency of the access channel found in the other system. If the mobile station has chosen a "wrong" cell in its first access attempt in the first system, the mobile station will be referred to a connection set-up in a similarly wrong cell, but now in the other system.

In the second case, the Directed Retry order includes a large number of frequencies instead of one frequency. In this case, there is a risk that even if the first frequency/cell was correct, the mobile in its search for an access channel may choose an unsuitable cell for its Directed Retry access due to the same problems as those described earlier with regard to fading. A Directed Retry also extends the time taken to establish a call connection, typically by 2–3 seconds.

DISCLOSURE OF THE INVENTION

In cellular mobile telesystems, a mobile station measures the received signal strength of transmitted control channels in determining the cell in which a connection shall be set-up. In those mobile telesystems in which the estimation of signal strength in the mobile station is effected solely by quickly measuring the strength of signal channels, there is a danger that the mobile station will often make a wrong choice and choose a frequency/cell which is not the best frequency/cell available, as distinct from measuring signal channel strength over a longer period of time. This is mainly due to fading of signals received from the control channels.

If the mobile station requests access to the system for the purpose of establishing a call connection, the call will be set-up in the cell in which the mobile station requested access, thus in the cell in which the control channel belongs. If the choice of cell is not an optimal choice, i.e. the mobile station has chosen a frequency which is actually not the strongest in the area, it is possible that speech quality will be poorer both with regard to the local connection and also with regard to other calls, as a result of elevated cochannel disturbance.

The aforesaid problem wherein the mobile stations sometimes choose a control channel of the wrong frequency due to fading is overcome by specifying several access channels for each traffic channel cell. The mobile station evaluates all of these access channels in its access channel selection. The mobile station will choose the access channel which is gathered to be the strongest channel. Consequently, all access channels in one and the same traffic channel cell transmit with approximately the same power output so that selection of the access channel by the mobile stations will be as random as possible. A small difference in power output will only have a marginal functional effect.

The novelty and uniqueness of the inventive arrangement is that a cell, characterized by the area covered by the traffic channels, is equipped with two or more access channels.

It is irrelevant in this context whether the cell is devoid of paging channels, has one or more paging channels, or whether the access channels are combined with the paging channels to form the aforesaid combined PAC control channels.

One object of the invention is to increase the likelihood of the mobile stations choosing to establish a call connection in the most optimal cell. This is achieved by virtue of not only utilizing the time diversity when measuring signal strength, i.e. measuring signal strength on different occasions, but also the frequency diversity, i.e. the use of different access channel frequencies.

Another object is to provide a stationary mobile station or a slowly moving mobile station with a good chance of choosing a correct cell.

One advantage afforded by the invention resides in an increase in access channel capacity.

Another advantage afforded by the invention resides in the increase in the probability that a connection will be set-up and that the connection will be set-up in the best cell.

Other advantages are that speech quality is improved on average, and that system loads, that necessitate handoff back to the correct cell during a call state, are reduced.

Still another advantage is that the invention can be carried out within the framework of current standards.

BRIEF DESCRIPTION OF THE DRAWINGS

The invention will now be described in more detail with reference to the accompanying drawings, in which

FIG. 8b is a frequency diagram relating to the channels shown in FIG. 8a; and

BEST MODE OF CARRYING OUT THE INVENTION

The situation in which a mobile station MS listens on control channels in the mobile telesystem will now be described with reference to FIGS. 1, 2a, 2b and 3. The control channels ill also be described.

Figure 1:
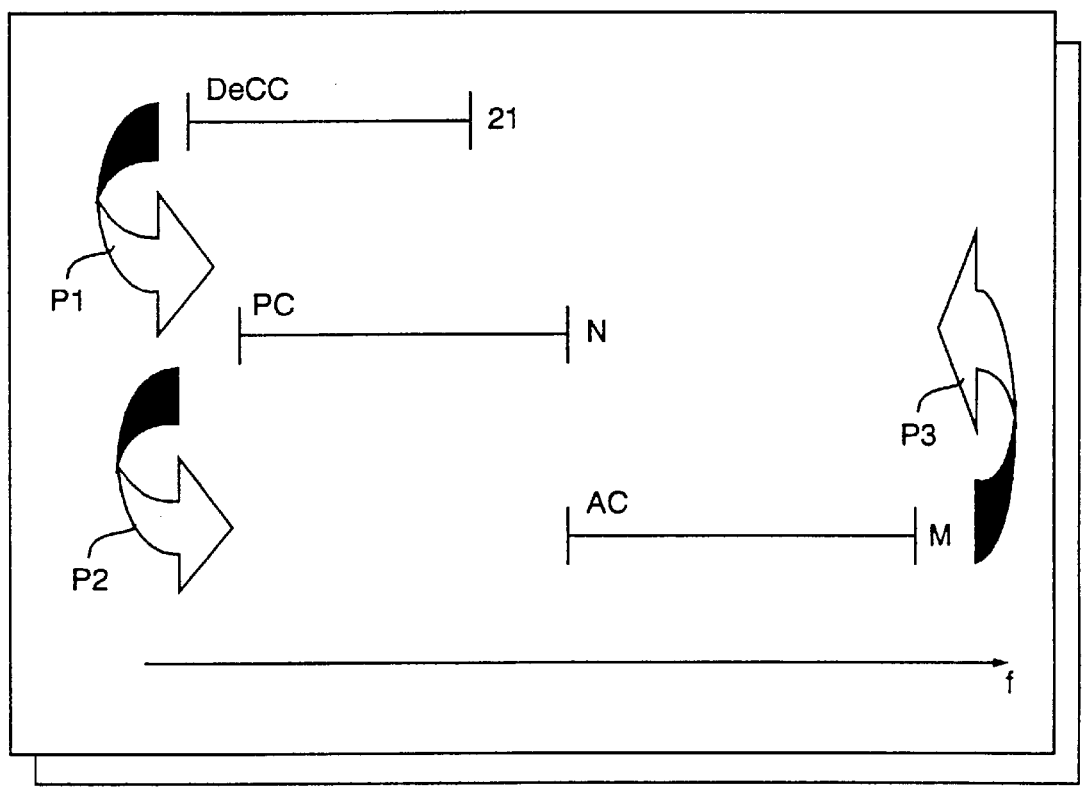
FIG. 1 is a frequency diagram illustrating the selection of paging and access channels.

FIG. 1 illustrates the Dedicated Control Channels DeCC, the Paging Channels PC, through which the mobile MS is paged by the mobile telesystem, and access channels AC through which the mobile can have access to the system. In FIG. 1, the frequency is referenced f, the number of paging channels PC is referenced N and the number of access channels AC is referenced M. The control channels DeCC are 21 in number.

During a typical user incident, the mobile station MS will pass through three distinct phases on the control channel. These phases are illustrated in FIG. 1. With a voltage applied, the mobile station will initially page a number of dedicated control channels DeCC. All mobile stations are aware of a number of predetermined frequencies, the position of these frequencies in the frequency spectrum, and the number of frequencies available. In the case of the interface specifications treated according to this example, the frequencies lie in the 800–900 MHz range and, as before mentioned, are 21 in number. After having scanned these channels, the mobile station will choose a channel DeCC which has the strongest signal and synchronize on this channel.

The mobile station MS extracts from the dedicated control channel DeCC information relating to the number of paging channels PC that the system uses, according to the illustrated example N in number, and the location thereof in the frequency spectrum. As indicated by an arrow Pl, the mobile station scans these paging channels PC and chooses the strongest paging channel.

The mobile station then remains locked to the selected paging channel and listens for messages directed to the mobile station (paging, order messages) or reacts to broadcast information. This information may, for instance, trigger a registration process or initiate renewed scanning and searching for the strongest of the paging channels. Also extracted from the broadcast information is knowledge of how many access channels the system uses, M number in the illustrated case, and where these channels lie in the frequency spectrum.

The access channel AC is used when the mobile station needs to contact the system. This need may be a direct response to transmitted broadcast information, concerning registration for instance, or may be a page response, or may be a call request from the mobile station MS, this request then being acted upon.

When the mobile station wishes to initiate an access procedure, the station will scan the access channels AC, in accordance with arrow P2, and choose the strongest of these channels. Upon completion of the transaction, often upon completion of a call on a traffic channel, the mobile station returns to the paging channels PC, as indicated by an arrow P3, and scans said channels and selects the strongest channel.

Figure 2A:
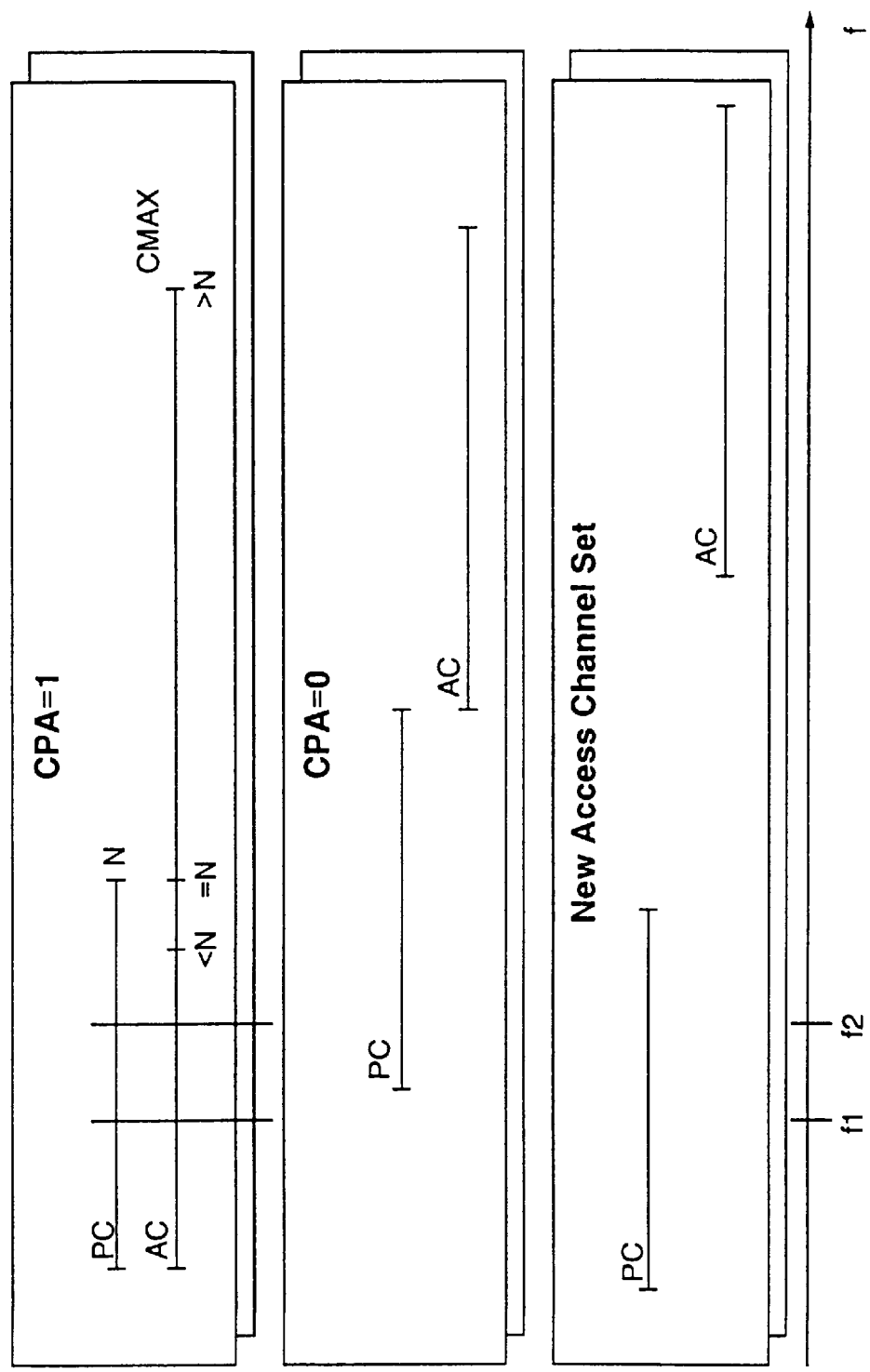
FIG. 2a is a frequency diagram showing different paging channel and access channel frequency distributions.
Figure 2B:
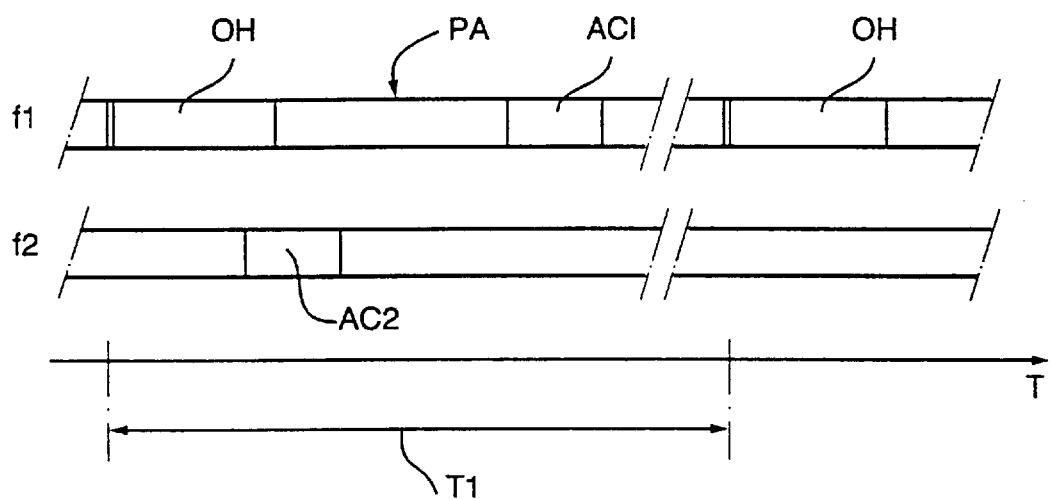
FIG. 2b illustrate sequences on a combined PAC control channel.

FIG. 2a illustrates how the mobile stations are able to determine the number and the position of the paging channels and access channels in the frequency space. The starting point for the paging channels PC is normally fixed and identical with the starting point for the dedicated control channels DeCC, although other starting points may be relevant. As in the former case, the frequency is referenced f in FIG. 2a.

The mobile stations extract from the broadcast information the parameter N, which denotes the number of paging channels, the parameter CMAX, which denotes the number N of access channels AC, and the parameter CPA, which discloses whether or not the paging and the access channels are the combined PAC control channels (Combined Paging and Access Channels), i.e. have the same starting point. When CPA=0, this indicates that the access channels begin at the frequency at which the paging channels terminate. In addition, it is possible to send a message "New Access Channel Set", by means of which it is possible to show on an access channel band in any selected place in the frequency space, although naturally within the framework of the f requency band permitted for the mobile telephony service.

As earlier mentioned, the AMPS and TACS systems normally use 21 control channels, which constitute the combined paging and access channels PAC. However, the AMPS and TACS systems both allow the function of the control channel to be divided into a paging channel and an access channel. According to the standards of both the AMPS and the TACS systems, the maximum number of channels that can be used (specification dependent) are 32 paging channels and 128 access channels.

21 control channel frequencies are used in practically all existing systems, these frequencies being used for the dedicated control channel DeCC, the paging channel PC and the access channel AC. This also applies to the aforementioned mobile telesystems AMPS and TACS, and said channel, the combined PAC control channel, is shown in more detail in FIG. 2b. Time is referenced T in this FIG. The channel includes two frequencies, one frequency f1 for the downlink and one frequency f2 for the uplink at a mutual radio channel spacing of 45 Mhz. Despite the aforesaid mobile telesystems being analogue systems, the control channel is digital insomuch as bit streams are transmitted on both frequencies f1 and f2. There is transmitted on the downlink from the system base station a bit sequence OH which includes so-called overhead information, for instance system identification, and the number N paging channels. There then follows a bit sequence PA which may include, among other things, paging information and commands to the mobiles, and may also include a bit sequence AC1 containing access information. The bit sequence OH reoccurs after a time interval T1, which has a duration of about 1 second. There is transmitted on the uplink from the mobile, the frequency f2 and a bit sequence AC2 containing access information. The two bit sequences AC1 and AC2 together form the access channel AC in the combined paging and access control channel PAC.

Figure 3:
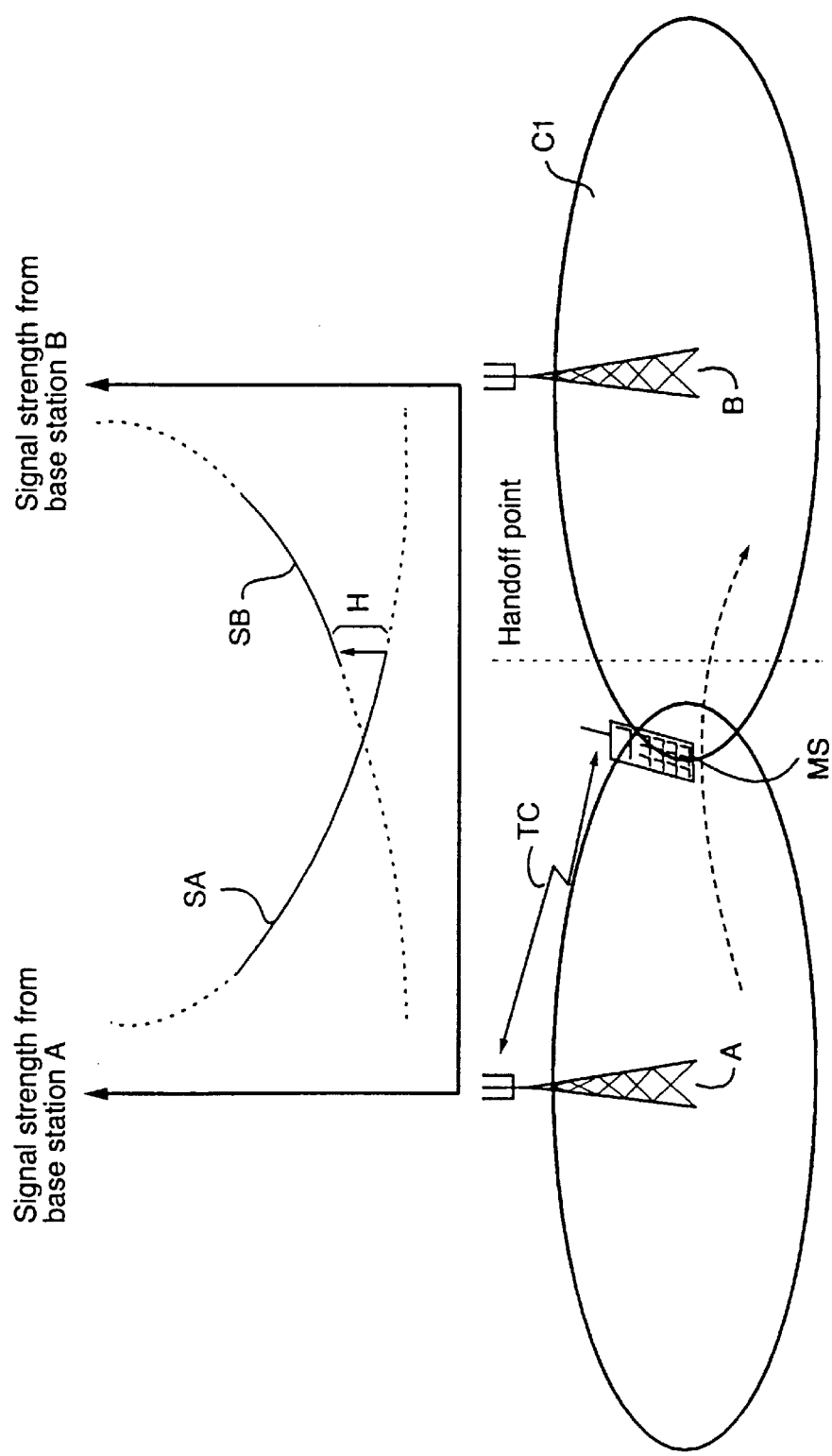
FIG. 3 is a view of cells in a mobile telesystem and also shows diagrammatically the signal strength in said cells.

FIG. 3 shows two base stations A and B, each in a resphective cell C1, and the mobile station MS. The FIG. also includes a signal strength diagram in which a curve SA indicates the signal strength from base station A and a curve SB indicates signal strength from the base station B. During a call, which is conducted on a traffic channel TC, the mobile station MS is normally allowed to deviate from a contemplated equisignal strength limit between the two cells by usually up to 3–5 dB. The permitted deviation forms an handoff hysteresis H which is used in practically all mobile telephone systems. Larger signal strength deviations will have a negative effect on speech quality.

In the case of access, approximately 10% of the mobile stations will choose the weaker frequency at a point at which the signal strength differs by as much as 9 dB or more. This is due to fading when fading can be considered uncorrelated between the two measured frequencies, as will be described below with reference to FIG. 4. Other errors are also contributory in this regard, for instance frequency-dependent signal strength measurements made in the mobile station. The following measuring procedure is recommended in the TACS specification, for instance, with the intention of counteracting these erroneous measurements: "With the intention of reducing the effect of fading when measuring signal strength, it is recommended that each frequency is measured on two occasions spaced 20 milliseconds apart, and that the highest value obtained on the two measuring occasions is used as an indication of signal strength".

Figure 4:
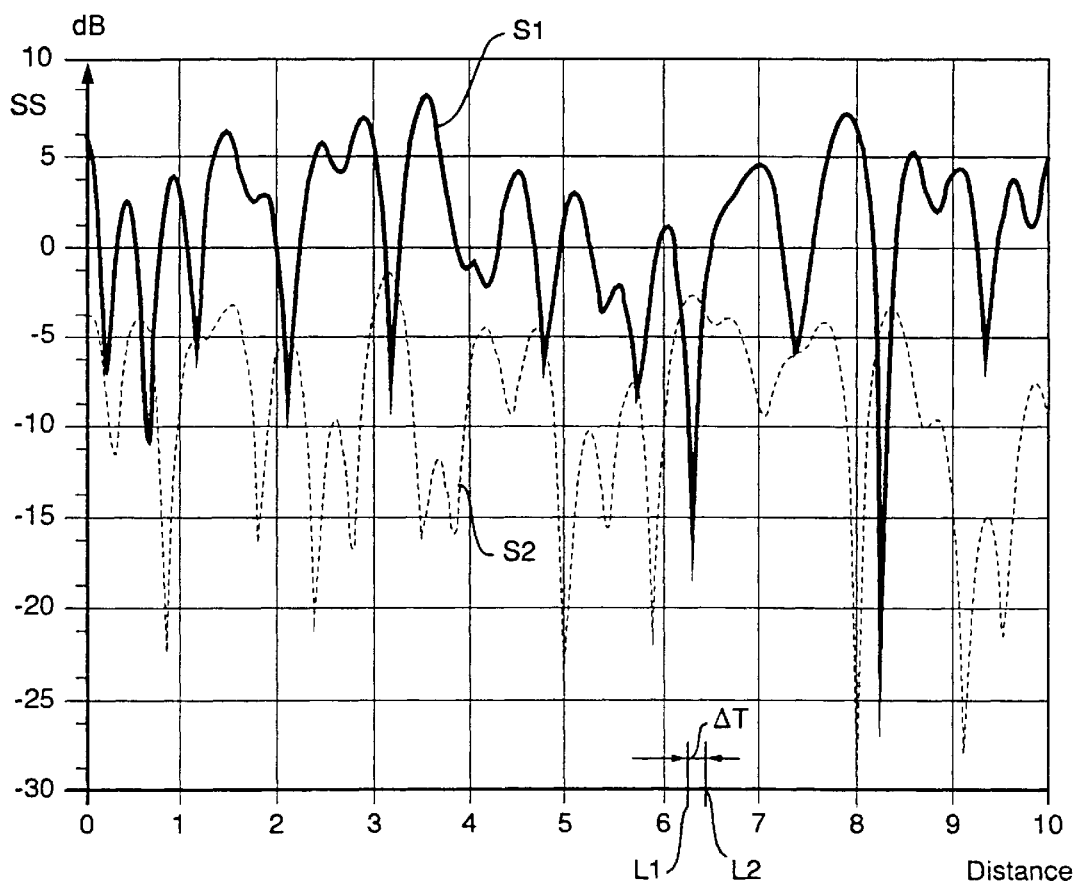
FIG. 4 is a signal strength diagram of fading cells.

FIG. 4 is a fading diagram with a wavelength $\lambda$=0.3 m for a 900 MHz carrier frequency measured on the abscissa, and a relative signal strength SS in dB on the ordinate. The FIG. illustrates two non-correlated fading signals S1 and S2 with an average difference in signal strength of 10 dB. The signal S1 is an access channel from the base station B in FIG. 3, and the signal S2 is an access channel from the base station A. It will be seen from the diagram that despite the difference in signal strength, the signal which is weaker on average will be the strongest signal at 0.6, 1.1, 2.1, 3.2, 6.3 and 8.2 $\lambda$ in the illustrated example. Each fading occasion has a duration of two or three tenths of $\lambda$, for instance on the fading occasion of 6.3 $\lambda$. One-tenth $\lambda$ is the distance travelled when moving at 6 km/h for 20 milliseconds and when the carrier frequency is 900 MHz. Even though the TACS system recommendation is followed and two measurements are made on the access channel AC at positions L1 and L2, corresponding to a time spacing of $\Delta T$=20 milliseconds, there is the risk that the weaker channel S2 will be chosen as the access channel when the mobile station MS is stationary or moves slowly.

The unnecessarily low signal strength at access increases the risk of a signalling error occurring in the connection Let-up, i.e. the system quality experienced will be unnecessarily low, in addition to the aforesaid problems concerning poor speech channel connection.

Because the signal strength of the signals S1 and S2 are measured in the mobile station MS, and therewith also the choice of cell, it should be necessary to make a standard change with regard to the interface in order to improve the situation. However, such a change would not be able to alter the situation with regard to the millions of mobile stations that have already been delivered and are spread throughout the world, i.e. such a change cannot improve the situation of the largelarge majority of mobile stations. It is therefore necessary to find a solution which lies within existing standards.

Figure 5:
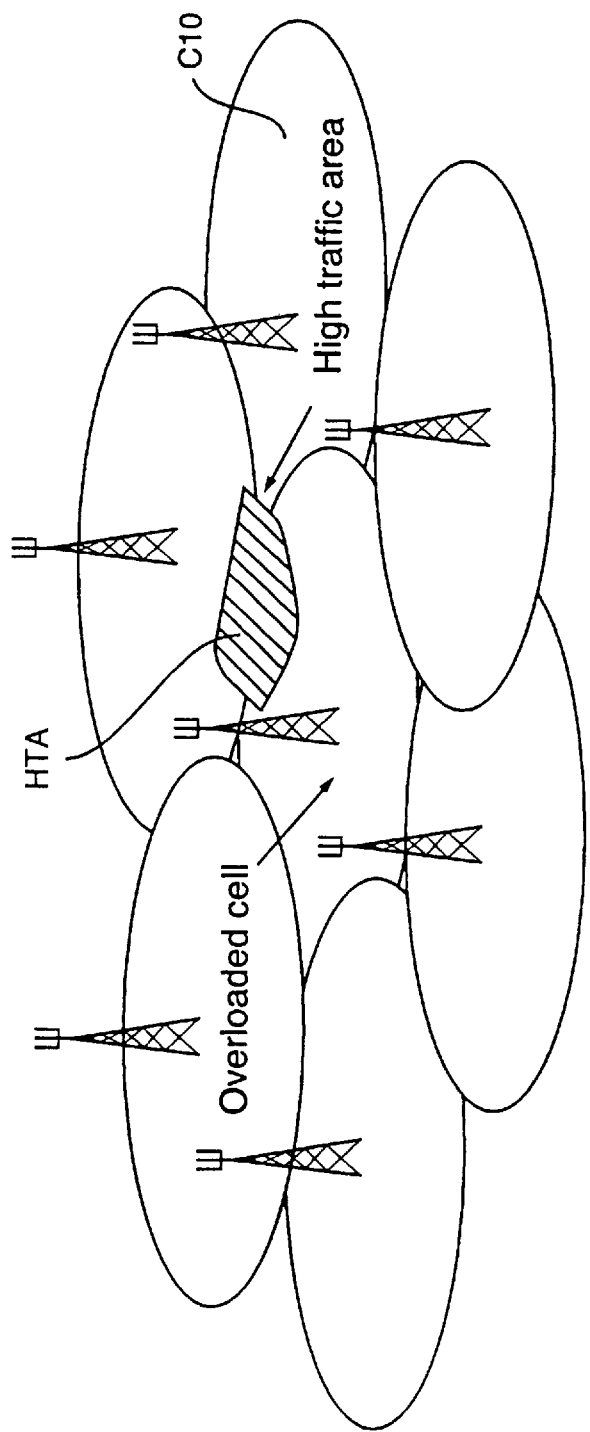
FIG. 5 illustrates cells having base stations.
Figure 6:
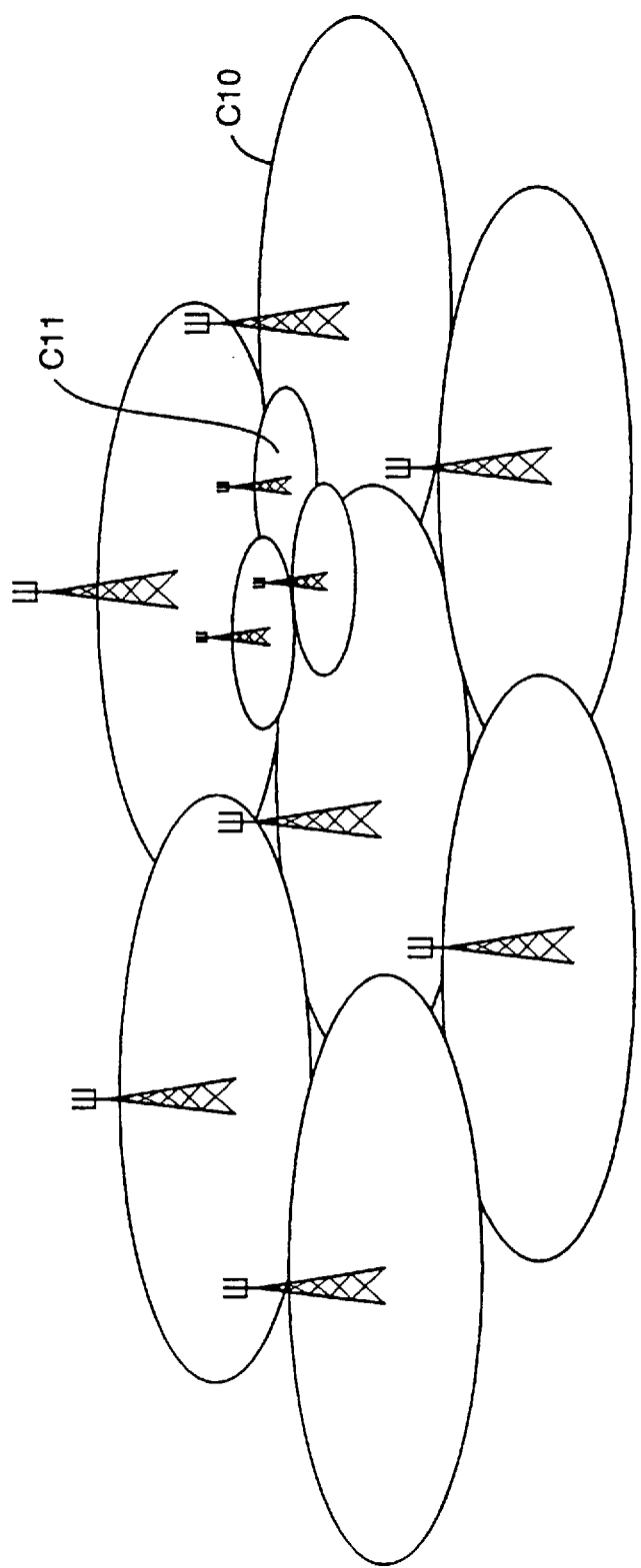
FIG. 6 shows the illustration of FIG. 5 with further cells and base stations.

FIGS. 5 and 6 show one known method of increasing the capacity of a mobile telesystem. A cellular mobile telesystem according to FIG. 5 has cells C10, each of which has a respective base station which each handle a respective combined PAC control channel. The mobile telephone traffic is extremely intensive within one area HTA, in other words there is a great need for speech channels. Naturally, the access channel and the paging channel both have a limited capacity. The capacity required will depend to a large extent on subscriber behaviour, cell size, etc., although it can also be determined to a large extent by the operator, for instance by limiting the area over which a paging message is transmitted, or by limiting the number of times the mobile stations are required to register themselves. A high capacity requirement, such as in the area HTA, is normally reflected in a high traffic channel requirement, and to resolve this problem more cells C11 with their own base stations are added, as shown in FIG. 6. When each cell C11 is equipped with a combined paging and access control channel, the access channel capacity is also enhanced immediately. The paging capacity of the combined PAC control channel also increases slightly, since the call set-up sequences in the area are now distributed over more PAC control channels.

Figure 7:
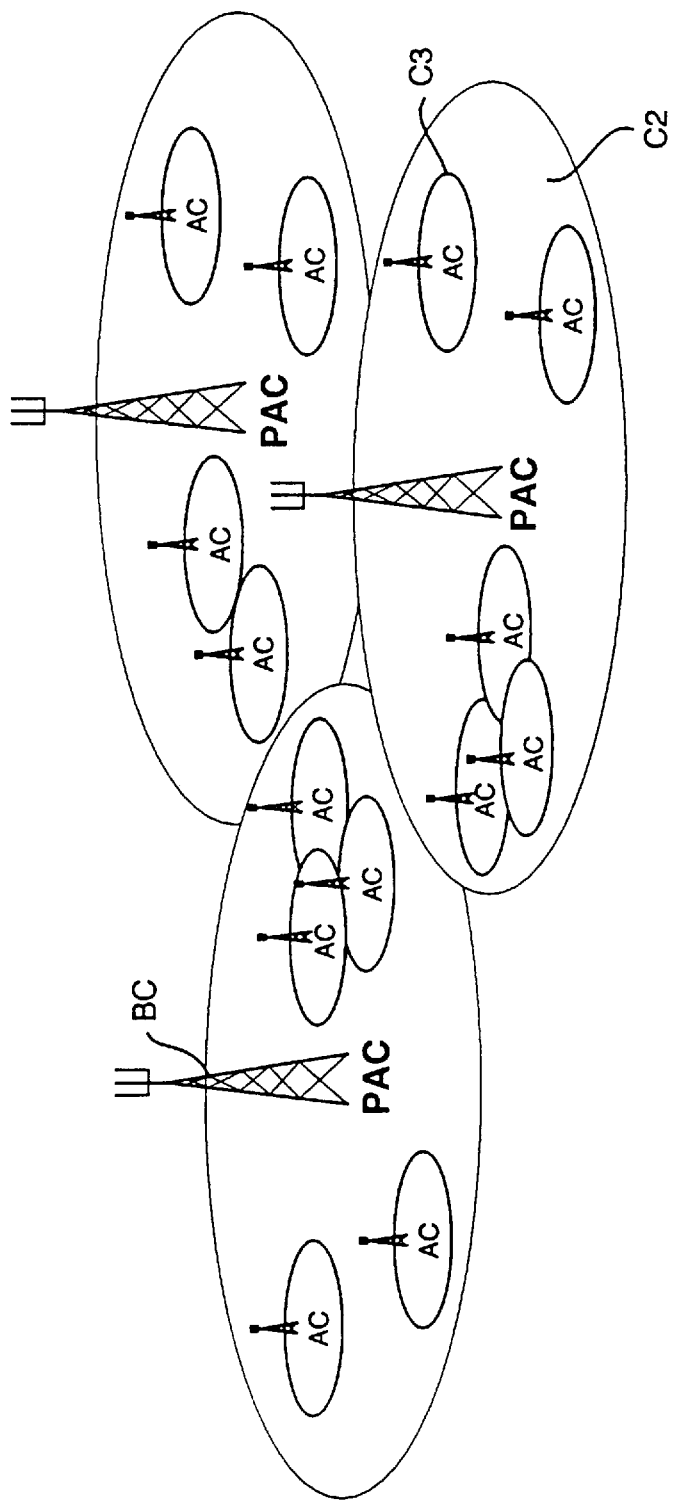
FIG. 7 illustrates a mobile telesystem having umbrella cells which have complete control channels and microcells which have solely access channels.

The word cell is absolutely one of the most common terms found in texts relating to mobile telephony. The term cell is initially quite easy to understand intuitively at first. But what is that actually characterizes a cell ? According to one definition, a cell is "the area served by a control channel and a number of traffic channels where the traffic channels can be exchanged insofar that all traffic channels possess mutually the same properties". This definition staggers slightly when the geographic area is divided into umbrella cells and microcells. FIG. 7 illustrates the umbrella cells C2 having base stations BC which utilize the combined PAC control channels. In certain parts of the umbrella cells C2, the microcells C3 having access channels will function relatively equally within the umbrella cell area C2. Other problems with this definition arise when beginning to contemplate around "paging cells" where the cell consists in only one paging channel while all accesses go to microcells equipped with access channels.

The radio environment also enters the reasoning that surrounds the term cell, and the channels operate at different frequencies which may be subjected to interference and disturbance to differing degrees. It is also conceivable that the channels will have different properties, for instance because the traffic channels belong to different hardware generations.

Consequently, a traffic channel cell is defined in the present description as a geographical area to which a number of traffic channels are bound, characterized in that all of the traffic channels can be exchanged insofar as all channels can provide the same base service over the whole of the cell area. Control channels can then be bound to the traffic channel cell, either the combined PAC control channels or purely paging channels or access channels.

Figure 8A:
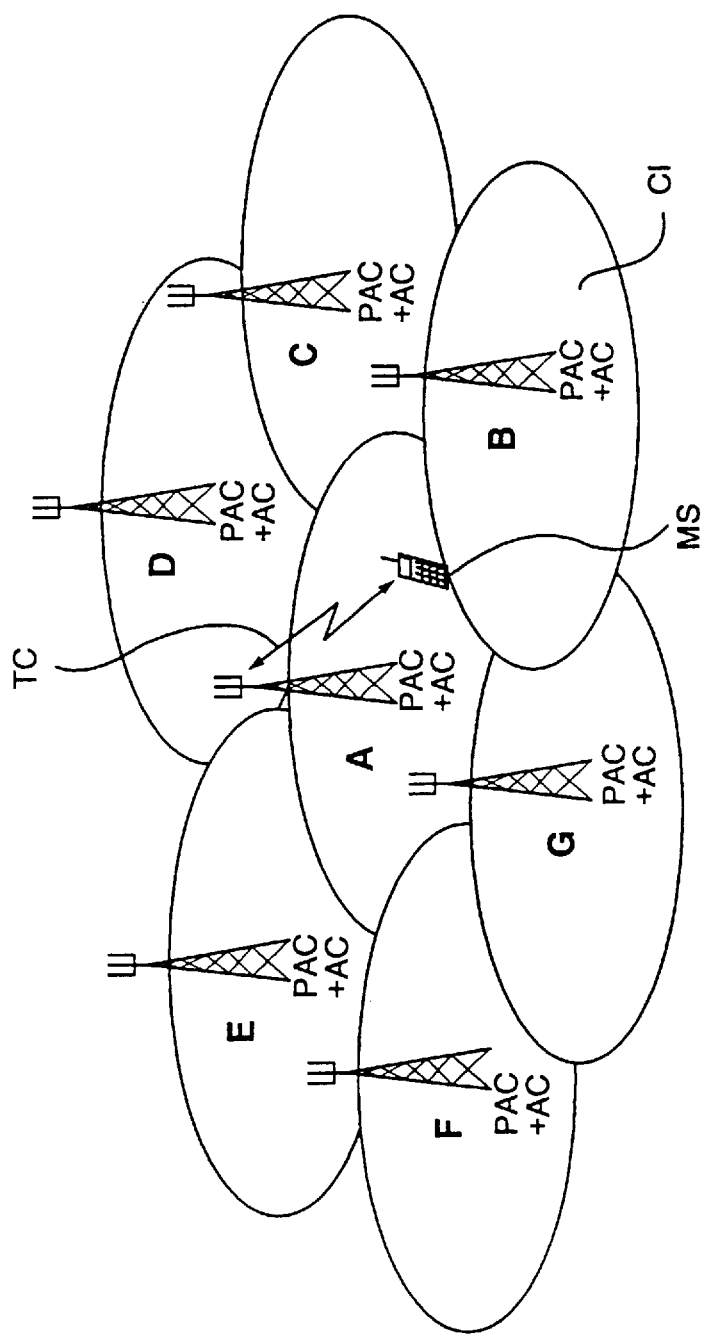
FIG. 8a illustrates a mobile telesystem having cells which each include a combined PAC control channel and a purely access channel.

FIG. 8a illustrates a part of the mobile telesystem shown in FIG. 3, and includes the cells C1, the base stations A and B and further base stations referenced C–G. Each cell is equipped with the combined PAC control channel and one of the purely access channels AC. The traffic channels TC are used for connections between the mobile station MS and the public switched part of the mobile telesystem, via the base stations. The channels intended for access purposes, the combined PAC control channel and the access channel AC, have essentially the same radio coverage area as the traffic channels TC. Naturally, the inventive principle will also function when each of the cells is equipped with a respective purely paging channel and two of the purely access channels AC, i.e. that CPA=0 in accordance with the aforegoing, or when using New Access Channel Set messages.

Figure 8B:
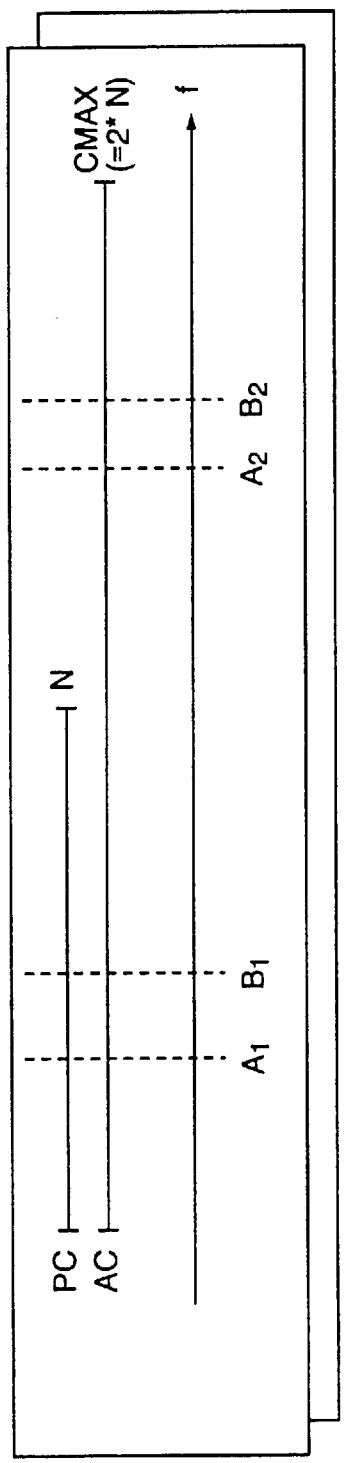

FIG. 8b illustrates a possible frequency plan in which the combined PAC control channel in cell A operates on a frequency $A_1$ and the purely access channel AC operates on a frequency $A_2$. Correspondingly, the cell B uses the frequencies $B_1$ and $B_2$, and so on. Thus, a frequency is chosen for each cell from the frequency band of the combined PAC control channel, and a frequency for the access channels AC is chosen from that part of the band which contains no paging channels. Because of the risk of disturbance, the frequencies shall not constitute neighbouring channel frequencies within one and the same cell. In order to utilize the diversity gains to a maximum, the access channel frequencies should also be spaced as far apart as possible. In a normal 21-cell pattern, it is reasonable to use a 21 channel separation between the access channels. The strength of the combined PAC control channel and the access channel AC is measured two times by the mobile MS in an access procedure, in order to utilize the time diversity as recommended in the specifications for AMPS and TACS mobile telesystems.

Figure 9:
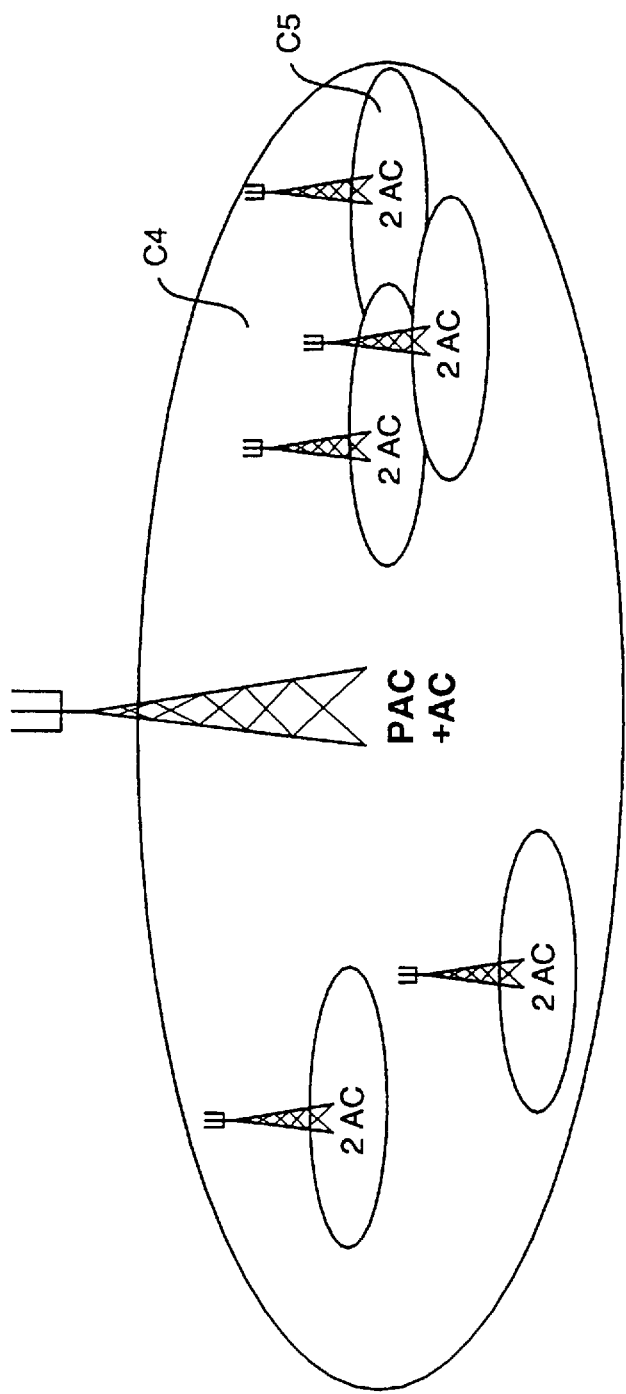
FIG. 9 illustrates an umbrella cell having both a combined PAC control channel, a purely access channel and microcells each having at least two access channels.

FIG. 9 illustrates part of a mobile telesystem including an umbrella cell C4 and microcells C5. The example illustrates the application of two access channels in each traffic channel cell in a microcell environment. The umbrella cell C4 includes the combined PAC control channel and the access channel AC, and each microcell C5 has two of the access channels AC. It will be noted that the access channels in the umbrella cell C4 have a strength in the microcell C5 which differs essentially from the signal strength of the own access channels of the microcells.

As an alternative to equipping a traffic channel cell with several access channels, there can be defined a new access cell having a covering and occupying area which is congruent with the traffic channel cell, equipped with one or more access channels and by associating this access cell with the traffic channel cell so that traffic channels are selected from the traffic channel cell for an access which enters the access cell. Irrespective of which alternative is chosen, there will be obtained a situation in which several access channels have a coverage area which is congruent with the traffic channel cell and where the choice of traffic channel need not necessarily depend on which access channel was chosen by the mobile station.

Another feasible variant is a fully loaded cell having paging, access and traffic channels, and an associated cell which is equipped with only one (or more) access channel (s), or with one (or more) access channel(s) and a number of traffic channels where traffic channels/traffic routing can be freely allocated between the fully loaded cell and the less loaded cell so that the system will not be influenced negatively by excluded trunking gains.

We claim:

1. An arrangement relating to a cellular analogue mobile telesystem which includes:

cells (C1) having base stations (A–G) which have access to traffic channels (TC) and control channels (PC, AC, PAC);

at least one traffic channel cell, which is one of the aforesaid cells (C1) and which includes a geographically restricted area within which all of the traffic channels (TC) dedicated to this area can be used for common predetermined purposes within the whole of said geographically restricted area, wherein said traffic channel cell (C1) has at least two of the control channels (AC, PAC) that are intended for access purposes; wherein the base stations (A–G) in predetermined of the traffic channel cells function to transmit in their respective cells (C1) said at least two control channels for access purposes (AC, PAC) with essentially the same power and at least one of the channels for access purposes is a combined control channel (PAC) for both paging the mobile station (MS) and obtaining access thereto;

a mobile station (MS) in the mobile telesystem is adapted to scan at least some of the control channels for access purposes (AC, PAC) and to select the control channel that has the strongest signal strength (S1); and wherein when setting up a connection, the mobile station (MS) functions to establish a connection on one of the traffic channels (TC) in the cell (C1) that has the selected access channel, whereby fading effects are mitigated as a result of providing said at least two control channels for access purposes.

2. An arrangement according to claim 1, wherein the mobile station (MS) functions to scan the channels (PAC, AC) intended for access purposes on at least two occasions spaced a predetermined distance apart in time (ΔT).

3. The system according to claim 1 wherein the mobile station's scanning and selection steps occur when the connection is established.

4. The system according to claim 1 wherein said at least two control channels operate at different frequencies.

5. In a cellular, analogue mobile telesystem a method which comprises:

delimiting at least one geographical area, said at least one area forming a cell (C1) in the mobile telesystem;

allocating traffic channels (TC) in the mobile telesystem, wherein all traffic channels in said at least one cell (C1) can be used for common predetermined purposes throughout the entire cell (C1), which constitutes a traffic channel cell;

allocating at least two control channels (AC, PAC) for access purposes to at least one of the traffic channel cells (C1), wherein at least one of the control channels for access purposes is a combined control channel (PAC) for both paging the mobile station (MS) and for access to said station;

transmitting the control channels (AC, PAC) for access purposes from a base station (A–G) in at least one of the traffic channel cells (C1), wherein the different control channels (AC, PAC) intended for access purposes in a traffic channel cell are transmitted with essentially the same power;

scanning at least a number of the control channels (AC, PAC) intended for access purposes in a mobile station (MS);

selecting the most powerful of the control channels (AC, PAC) for access purposes; and establishing a connection to the mobile station (MS) via one of the traffic channels (TC) in that cell which has the control channel (AC, PAC) chosen for access purposes, whereby fading effects are mitigated as a result of providing the at least two control channels for access purposes.

6. A method according to claim 5, wherein the mobile station (MS) scans the control channels (PAC, AC) intended for access purposes on at least two occasions at a predetermined time distance (ΔT) apart.

7. The method according to claim 5 wherein the mobile station's scanning and selection steps occur when the connection is established.

8. The method according to claim 5 wherein said at least two control channels operate at different frequencies.

9. A mobile cellular system comprising:

a plurality of cells;

wherein at least one of said plurality of cells is equipped with at least two control channels, each operating at different frequencies, which control channels are used for access purposes; and wherein said at least two control channels transmit with substantially the same power, whereby fading effects are mitigated as a result of providing the at least two control channels for access purposes.

10. The cellular system according to claim 9 wherein at least one of said at least two control channels is a combined control channel for both paging and access.

11. A method of accessing a radiocommunication system comprising the steps of:

providing a plurality of cells and a plurality of control channels used for access to said system, each cell comprising a base station and at least two of said plurality of control channels;

scanning said plurality of control channels by a mobile station; and selecting, by said mobile station, one of said plurality of control channels having the strongest signal strength;

wherein said at least two control channels transmit with substantially the same power; and said at least two control channels used in each cell operate at different frequencies, whereby fading effects are mitigated during said scanning step.

12. The method according to claim 11 wherein at least one of said at least two control channels is a combined control channel for both paging and access.

* * * * *